US008296837B2

(12) United States Patent
Manville et al.

(10) Patent No.: US 8,296,837 B2
(45) Date of Patent: Oct. 23, 2012

(54) VOIP PROXY SERVER

(75) Inventors: John T. Manville, New Providence, NJ (US); Sabet A. Elias, Freehold, NJ (US); Philip Palevo, Jr., Holmdel, NJ (US); Scott Ronald Shaw, Ossining, NY (US); Andre R. John, Montclair, NJ (US)

(73) Assignee: Barclays Capital Inc., New York, NY (US)

( * ) Notice: Subject to any disclaimer, the term of this patent is extended or adjusted under 35 U.S.C. 154(b) by 770 days.

(21) Appl. No.: 11/378,184

(22) Filed: Mar. 16, 2006

(65) Prior Publication Data

US 2007/0050843 A1 Mar. 1, 2007

Related U.S. Application Data

(60) Provisional application No. 60/663,077, filed on Mar. 18, 2005.

(51) Int. Cl.
*G06F 15/16* (2006.01)
(52) U.S. Cl. ................................ 726/12; 726/3; 726/11
(58) Field of Classification Search ................ 726/3, 11, 726/12
See application file for complete search history.

(56) References Cited

U.S. PATENT DOCUMENTS

| | | | | |
|---|---|---|---|---|
| 7,826,602 | B1 * | 11/2010 | Hunyady et al. | 379/93.09 |
| 2001/0056476 | A1 * | 12/2001 | Benayoun et al. | 709/218 |
| 2003/0093563 | A1 * | 5/2003 | Young et al. | 709/245 |
| 2003/0161297 | A1 * | 8/2003 | Noda et al. | 370/352 |
| 2005/0201304 | A1 * | 9/2005 | Olshansky | 370/282 |
| 2007/0036143 | A1 * | 2/2007 | Alt et al. | 370/352 |

FOREIGN PATENT DOCUMENTS

WO 2004006520 1/2004

OTHER PUBLICATIONS

Singh et al., Peer-to-Peer internet Telephony using SIP, Jun. 13-14, 2005, ACM, 1-58113-987-X/05/0006.*
1st Office Action for Canadian Patent Application 2,603,341 dated Nov. 24, 2009, 4 pages.
2nd Office Action for Canadian Patent Application 2,603,341 dated Nov. 26, 2010, 3 pages.
1st Office Action for Chinese Patent Application 200680015251.0 dated Mar. 6, 2009, 14 pages.
2nd Office Action for Chinese Patent Application 200680015251.0 dated Mar. 2, 2010, 9 pages.
3rd Office Action for Chinese Patent Application 200680015251.0 dated Nov. 19, 2010, 14 pages.

(Continued)

*Primary Examiner* — Jeffrey Pwu
*Assistant Examiner* — Samuel Ambaye
(74) *Attorney, Agent, or Firm* — Morgan Lewis & Bockius LLP

(57) ABSTRACT

A Voice over Internet Protocol (VoIP) proxy server is described. The VoIP proxy server is placed in a DMZ of a company's secure internal communication network. The VoIP proxy server receives VoIP control messages and VoIP media streams and based on the MAC address and source IP address contained in the control message, pushes a policy change to the internal network's external firewall to open call control protocol ports and Real Time Protocol (RTP) ports only for packets from the source IP address. The VoIP proxy server manages the hiding of the company's internal network address and directs incoming VoIP packets to an IP-PBX connected to the company's internal network.

8 Claims, 2 Drawing Sheets

OTHER PUBLICATIONS

International Preliminary Examination Report on Patentability for PCT/US2006/009947 dated Dec. 27, 2007, 5 pages.
International Search Report for PCT/US2006/009947 dated Nov. 28, 2007, 3 pages.
Written Opinion for PCT/US2006/009947 dated Nov. 28, 2007, 3 pages.
Publication for PCT/US2006/009947 dated Sep. 28, 2006, 16 pages.

* cited by examiner

VOIP PROXY SERVER

CROSS-REFERENCE TO RELATED APPLICATIONS

This application claims the benefit of prior filed U.S. Provisional Application No. 60/663,077, filed Mar. 18, 2005, which is incorporated herein by reference.

BACKGROUND OF THE INVENTION

The present invention relates to secure communication networks. More specifically, the invention relates to allowing access to a company's phone network from an external communications network while maintaining the security of the secure communications network.

The Internet is an example of an external communications network that enables remote access to a company's internal communications network without being directly connected to the company's network. A workstation connected to the Internet can connect to the company's network and remotely access any of the allowed network services on the company's network. This is especially convenient for telecommuters or business travelers that can access the company's network from their home or away from their office.

Remote access to a company's network, however, increases the risk that an unauthorized user may gain access to the company's network and steal or damage information stored on the network. The company's internal network is usually isolated from the external communications network by a firewall that manages access to the company's internal network.

Many companies have merged their internal data network with their telephone system using Voice over Internet Protocol (VoIP). In such a system, the company's phones are connected to the internal network and access the external phone system through a PBX that manages the interface between the external telephone network and the company's internal network.

Merging the company's telephone network with their internal communication network, enables the remote business traveler or telecommuter to access their business phone when away from their office. Voice applications, however, usually require a range of IP addresses and port ranges. The company's firewall must, therefore, open a range of IP addresses and port ranges to the external network, which are all possible points of entry for an unauthorized user.

In many situations requiring endpoint-to-endpoint access, a remote computer establishes a virtual private network (VPN) connection that gives the remote user access to the internal network. A VPN connection, however, represents a security risk because there is no assurance that the remote computer is clean and does not contain viruses or other malware that could compromise the internal network. Therefore, there remains a need for systems and methods for enabling transparent remote access to a company's internal phone lines from an external network without establishing a VPN connection.

SUMMARY OF THE INVENTION

One embodiment of the present invention is directed to a Voice over Internet Protocol (VoIP) proxy server that is placed in a demilitarized zone (DMZ) of a company's secure internal communication network. The VoIP proxy server receives VoIP control messages and VoIP media streams and based on the MAC address and source IP address contained in the control message, pushes a policy change to the internal network's external firewall to open call control protocol ports and Real Time Protocol (RTP) ports only for packets from the source IP address. The VoIP proxy server manages the hiding of the company's internal network address and directs incoming VoIP packets to an Internet Protocol Private Branch Exchange (IP-PBX) connected to the company's internal network.

One embodiment of the present invention is directed to a system comprising: an external firewall connected to an external communication network and a DMZ; an internal firewall connected to an internal communication network and the DMZ; an IP-PBX connected to the internal communication network; and a VoIP proxy server connected to the DMZ, the VoIP proxy server configured to receive VoIP messages from the external firewall and forward the received VoIP messages through the internal firewall to the IP-PBX.

Another embodiment of the present invention is directed to a method comprising: receiving a request from a remote user's ePhone; identifying a source IP address in the request; pushing a firewall policy change to an external firewall, the firewall in response to the policy change opening a port for the source IP address; forwarding a call control message from the ePhone to an IP-PBX via an internal firewall; and forwarding a registration request from the IP-PBX to the ePhone through the external firewall. A further aspect comprises retrieving a configuration file for the ePhone based on a MAC address of the ePhone; and authenticating and authorizing the user based on the retrieved configuration file. In a further aspect, the step of forwarding the call control message further comprises replacing a destination IP address of an incoming packet with an IP address of the IP-PBX. In a further aspect, the step of forwarding the registration request further comprises replacing a source address of the registration request with an address of a VoIP proxy server. In another aspect, the step of forwarding the call control message further comprises adding a header containing an internal IP address of the IP-PBX. In another aspect, the step of forwarding the registration request further comprises removing a header containing an internal IP source address from the forwarded registration request.

BRIEF DESCRIPTION OF THE DRAWINGS

The invention will be described by reference to the preferred and alternative embodiments thereof in conjunction with the drawings in which.

DETAILED DESCRIPTION

The description herein should be understood to describe only one preferred embodiment of the invention. Those skilled in the art will recognize, for example, that the described embodiment is just one simplified example of the novel system and method of monitoring trading manager performance. The simplified example is all that needs to be described in detail in order to enable the more general system and method that the invention comprises.

Figure 1:
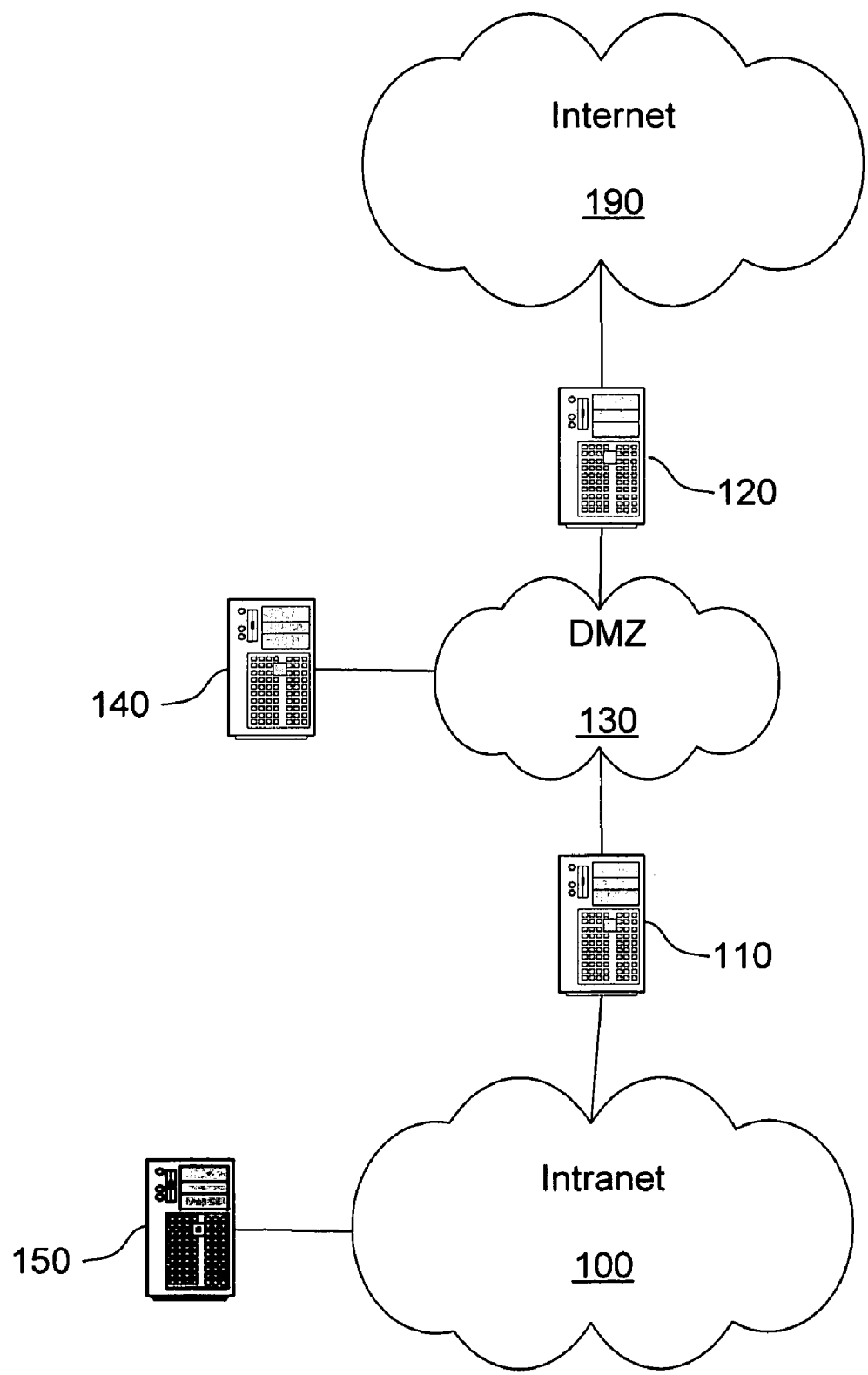
FIG. 1 is a schematic diagram of an embodiment of the present invention.

FIG. 1 is a schematic diagram of an embodiment of the present invention. In FIG. 1, an internal communication network 100 is connected to an external communication network 190 through an internal firewall 110 and an external firewall 120. In a preferred embodiment, the external communication network 190 is an internet. In some embodiments, the internal communication network is an intranet. A local area network, commonly referred to as a DMZ 130 resides between the internal firewall 100 and the external firewall 120. A Voice over Internet Protocol (VoIP) proxy server 140 is connected to the DMZ 130. An IP-PBX 150 is connected to the internal network 100.

The external firewall 120 provides a secure entry point from the internet into the company's internal network. The external firewall 120 may filter network packets from the external network and route allowed or authorized packets to the DMZ for further processing. In a preferred embodiment, the external firewall 120 also hides the company's internal network addresses by acting as a proxy server for packets coming from or going to the external network 190. The internal firewall 110 allows only packets having a restricted range of source IP addresses to pass through the internal firewall 110 to the internal network 100. In a preferred embodiment, the external firewall 120 and the internal firewall 110 are physically separate servers. In some alternate embodiments, the external firewall and the internal firewall may be hosted by a single server computer. The DMZ 130 is preferably a local area network that is connected to the external firewall 120 and internal firewall 110 and acts as a bridge between the internal and external firewalls.

The VoIP proxy server 140 is connected to the DMZ 130 and receives incoming VoIP control messages and VoIP media streams, collectively referred to as VoIP messages, from the external firewall 120. In a preferred embodiment, the VoIP proxy server 140 provides network address translation for the VoIP control and media packets. The VoIP proxy server 140 forwards the control and media streams through the internal firewall to the internal network 100. An IP-PBX 150 connected to the internal network 100 receives the control and media streams and transmits return messages and media streams.

Figure 2:
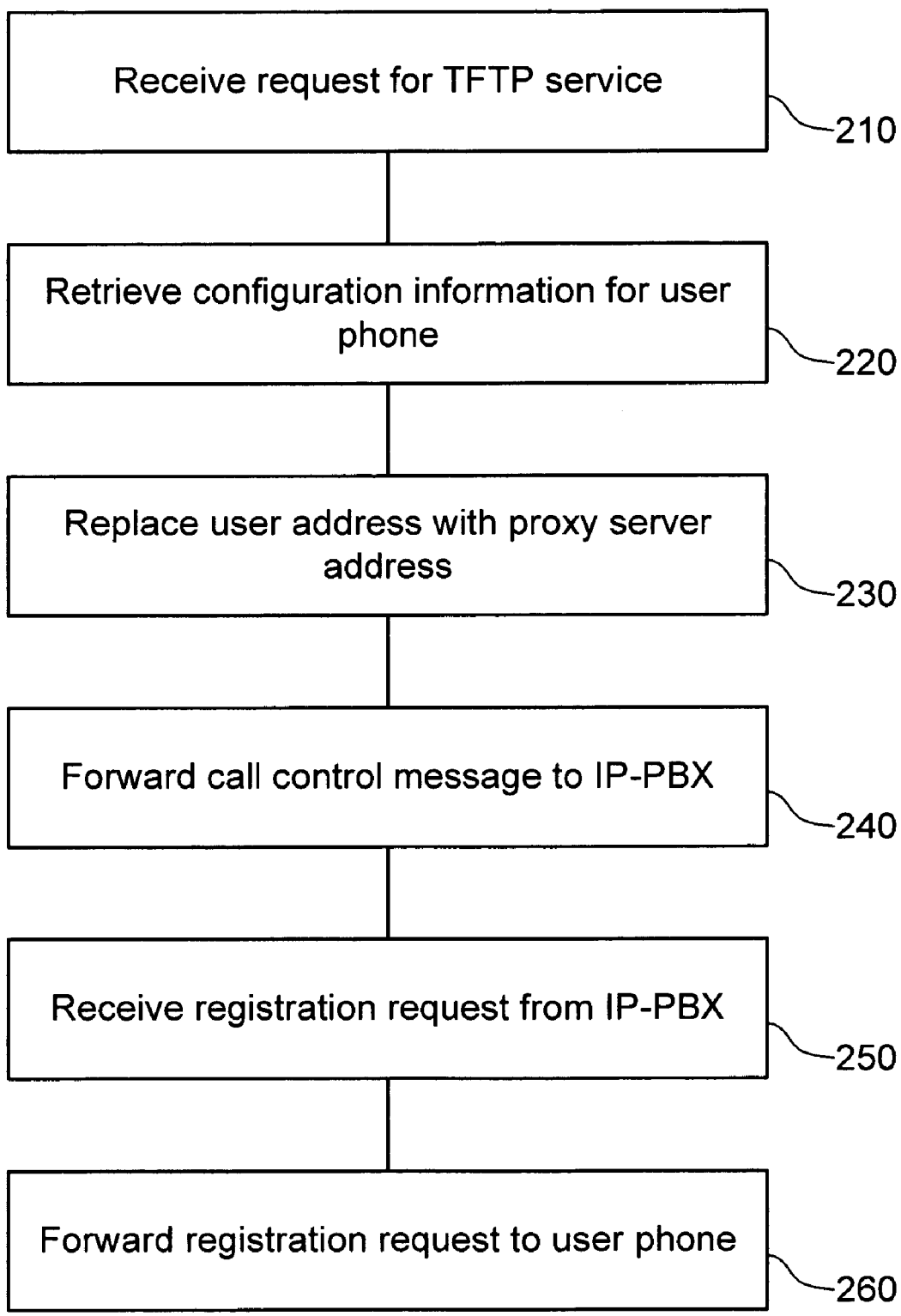
FIG. 2 is a flow diagram illustrating an embodiment of the present invention.

FIG. 2 is a flow diagram illustrating an embodiment of the present invention. In FIG. 2, the VoIP proxy server receives a request from a remote user for a trivial file transfer protocol (TFTP) service in 210. In a preferred embodiment, the remote user may use a traditional phone connected to an analog-digital converter (ADC), an internet phone or a remote computer executing a softphone application, referred to collectively as an ephone. The user may connect the ePhone to the internet through a local internet service provider (ISP).

The VoIP proxy server retrieves a configuration file containing configuration information for user's phone based on the Media Access Control (MAC) address of the user's internet phone or remote computer in step 220. The VoIP proxy server identifies a source IP address in the request and pushes a firewall policy change to the external firewall 120 after the user has been authenticated and authorized using the internal network's security procedures. The external firewall 120, in response to the policy change, opens call control protocol and Real Time Protocol (RTP) ports for that user phone's IP address for a set period of time.

In step 230, the VoIP proxy server redirects the incoming VoIP packets to an internal network address or hides the internal network address for outgoing packets. For incoming packets, the VoIP proxy server replaces the destination IP address of the packet with the IP address of the internal IP-PBX. For outgoing packets, the VoIP proxy server replaces the source address, which is the internal address of the IP-PBX, with its IP address. Alternatively, instead of replacing the destination or source IP address, the proxy server may add a header containing an internal IP destination address to the incoming packet or strip a header containing an internal IP source address from the outgoing packet.

In step 240, the VoIP proxy server forwards the received call control message to the internal IP-PBX. In response to the call control message, the internal IP-PBX sends a registration request for the user's ePhone back to the VoIP proxy server. In step 250, the VoIP proxy server receives the registration request from the internal IP-PBX, replaces the source IP address containing the internal IP-PBX's IP address with the VoIP proxy server IP address. In step 260, the VoIP proxy server forwards the registration request to the user's ePhone to complete the registration of the ephone. Once the user's ePhone is registered, the user may place a call, which sends call control messages and media streams to the VoIP proxy server. The external firewall listens for the user's IP address and only packets with the user's IP address through the exposed User Datagram Protocol (UDP) ports. Limiting access to the UDP ports to a specified IP source address minimizes the risk of an unauthorized intruder gaining access through the UPD ports while providing remote access to the company's internal phone system.

Embodiments of the present invention comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A system comprising:
    an external firewall connected to an external communication network and a DMZ;
    an internal firewall connected to an internal communication network and the DMZ;
    an IP-PBX connected to the internal communication network; and
    a VoIP proxy server connected directly to the DMZ, the VoIP proxy server configured to receive a request from an ePhone connected to the external communication network for a trivial file transfer protocol (TFTP) service, identify a source IP address of the ePhone in the request, push a firewall policy change to the external firewall after receiving the request from the ePhone, forward a call control message to the IP-PBX via the internal firewall, receive a registration request for the ePhone in response to the call control message from the IP-PBX, and forward the registration request to the ePhone through the external firewall,
    the external firewall configured to open a port for the source IP address and only allow packets having a source IP address identical to the source IP address of the ePhone through the external firewall at that port in response to the firewall policy change.

2. A method comprising:
receiving, at a VOIP proxy server connected directly to a DMZ, a request from a remote user's ePhone connected to an external communication network for a trivial file transfer protocol (TFTP) service;
identifying a source IP address of the user's ePhone in the request;
pushing a firewall policy change to an external firewall after receiving the request from the remote user's ePhone;
opening a port for the source IP address and only allowing packets having a source IP address identical to the source IP address of the ePhone through the external firewall at that port in response to the policy change;
forwarding a call control message from the VOIP proxy server to an IP-PBX via an internal firewall; and
forwarding the registration request from the VOIP proxy server to the ePhone through the external firewall.

3. The method of claim 2 further comprising:
retrieving a configuration file for the ePhone based on a MAC address of the ePhone; and
authenticating and authorizing the user based on the configuration file.

4. The method of claim 2 wherein the step of forwarding a call control message further comprises replacing a destination IP address of an incoming packet with an IP address of the IP-PBX.

5. The method of claim 2 wherein the step of forwarding a registration request further comprises replacing a source IP address of the registration request with an IP address of a VoIP proxy server.

6. The method of claim 2 wherein the step of forwarding a call control message further comprises adding a header containing an internal IP address of the IP-PBX.

7. The method of claim 2 wherein the step of forwarding a registration request further comprises removing a header containing an internal IP source address from the registration request.

8. A method comprising:
connecting an ePhone having a source IP address to an external communication network;
sending a request from the ePhone for a trivial file transfer protocol (TFTP) service to a VoIP proxy server connected directly to a DMZ, the request causing the VOIP proxy server to push a firewall policy change to an external firewall after the VOIP proxy server receives the request, the external firewall opening a port for the source IP address and only allowing packets having a source IP address identical to the source IP address of the ePhone through the external firewall at that port in response to the policy change;
sending a call control message to an IP-PBX through the VoIP proxy server;
receiving a registration request from the IP-PBX through the VoIP proxy server; and
placing a call on the ePhone in response to the registration request, the call routed through the VoIP proxy server.

* * * * *

UNITED STATES PATENT AND TRADEMARK OFFICE
CERTIFICATE OF CORRECTION

| | |
|---|---|
| PATENT NO. | : 8,296,837 B2 |
| APPLICATION NO. | : 11/378184 |
| DATED | : October 23, 2012 |
| INVENTOR(S) | : Manville et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Eleventh Day of November, 2014

Michelle K. Lee
*Deputy Director of the United States Patent and Trademark Office*